United States Patent
Tatematsu et al.

(10) Patent No.: US 8,242,645 B2
(45) Date of Patent: Aug. 14, 2012

(54) ROTATING ELECTRIC MACHINE ENABLING COOLING OF A COOLING TARGET REGION

(75) Inventors: Kazutaka Tatematsu, Nagoya (JP); Eiji Yamada, Owariasahi (JP); Atomi Arakawa, Anjo (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 260 days.

(21) Appl. No.: 12/669,444

(22) PCT Filed: Jul. 17, 2008

(86) PCT No.: PCT/JP2008/063338
§ 371 (c)(1),
(2), (4) Date: Jan. 15, 2010

(87) PCT Pub. No.: WO2009/011460
PCT Pub. Date: Jan. 22, 2009

(65) Prior Publication Data
US 2010/0194220 A1    Aug. 5, 2010

(30) Foreign Application Priority Data

Jul. 19, 2007 (JP) .................................. 2007-188450

(51) Int. Cl.
*H02K 1/32* (2006.01)
*H02K 9/00* (2006.01)
(52) U.S. Cl. .......................................... 310/61; 310/52
(58) Field of Classification Search .................. 310/52, 310/54, 61, 60 A, 58, 89; *H02K 1/32*
See application file for complete search history.

(56) References Cited

U.S. PATENT DOCUMENTS

| | | | |
|---|---|---|---|
| 6,897,581 B2 * | 5/2005 | Doherty et al. | 310/52 |
| 2006/0091743 A1 | 5/2006 | Iwasaki et al. | |

FOREIGN PATENT DOCUMENTS

| | | |
|---|---|---|
| EP | 0 853 370 A1 | 7/1998 |
| JP | 56-20349 U | 2/1981 |
| JP | 02-219447 A | 9/1990 |
| JP | 04-029544 A | 1/1992 |

(Continued)

OTHER PUBLICATIONS

JPO Machine Translation, JP 2007-020337, Oct. 11, 2011.*

(Continued)

*Primary Examiner* — Quyen Leung
*Assistant Examiner* — Thomas Truong
(74) *Attorney, Agent, or Firm* — Sughrue Mion, PLLC (57) ABSTRACT

A rotating electric machine includes a rotation shaft arranged rotatably, a rotor having a storing hole capable of storing a permanent magnet, including the permanent magnet stored in the storing hole, and being fixed to the rotation shaft, a stator facing the rotor and including a coil, an end plate provided at an axial end of the rotor, a coolant passage formed in the end plate and running along an axial end of the permanent magnet for allowing a coolant to flow, and a discharge hole located at a radially inner side of the rotor with respect to a cooling target region including the permanent magnet and being located at an outer circumferential side of the rotor from a radially inner end of the permanent magnet, the discharge hole communicating with the coolant passage and being capable of discharging the coolant.

8 Claims, 9 Drawing Sheets

FOREIGN PATENT DOCUMENTS

| | | |
|---|---|---|
| JP | 5-4766 U | 1/1993 |
| JP | 10-178754 A | 6/1998 |
| JP | 2000-201452 A | 7/2000 |
| JP | 2001-016826 A | 1/2001 |
| JP | 2001-112210 A | 4/2001 |
| JP | 2002-125352 A | 4/2002 |
| JP | 2002-325394 A | 11/2002 |
| JP | 2003-169448 A | 6/2003 |
| JP | 2005-006429 A | 1/2005 |
| JP | 2006-006091 A | 1/2006 |
| JP | 2006025545 A * | 1/2006 |
| JP | 2006-129600 A | 5/2006 |
| JP | 2006-180617 A | 7/2006 |
| JP | 2007020337 A * | 1/2007 |
| JP | 2007-174755 A | 7/2007 |

OTHER PUBLICATIONS

JPO Machine Translation, JP 2007-174755, Oct. 11, 2011.*

* cited by examiner

ROTATING ELECTRIC MACHINE ENABLING COOLING OF A COOLING TARGET REGION

TECHNICAL FIELD

The present invention relates to a rotating electric machine, and more particularly to a rotating electric machine enabling cooling of a cooling target region including permanent magnets.

BACKGROUND ART

Various types of rotating electric machines such as electric motors that cool magnets or coil ends of a stator with a cooling oil or the like have been conventionally proposed. For example, an electric motor described in Japanese Patent Laying-Open No. 2006-006091 includes a rotor having permanent magnets, a rotor with coils wound therearound, and an ejection hole for ejecting a coolant toward the permanent magnets.

In this rotating electric machine, the coolant is ejected to coil ends after magnetic impurities contained in the coolant are adsorbed to the magnets, thereby preventing an insulation coating at the coil ends from being damaged.

A rotating electric machine described in Japanese Patent Laying-Open No. 2005-006429 includes a stator with a plurality of slots formed therein and a rotor arranged rotatably in a hollow portion of this stator. An insulation paper is disposed in the slots, around which coils are wound. This rotating electric machine includes a cooling oil passage supplying a coolant to end faces of the rotor, and inclined portions guiding the coolant to the coil ends located above the insulation paper.

In an electric motor described in Japanese Patent Laying-Open No. 2003-169448, a lubricating oil supplied to bearing components of a rotor shaft passes along a lubricant path defined in the rotor and is ejected toward coil ends of a stator, thereby cooling the coil ends.

An electric motor described in Japanese Patent Laying-Open No. 2001-016826 includes a rotor shaft having a hollow portion and a rotor with an oil passage formed therein communicating with the hollow portion. The oil passage formed in the rotor communicates with an oil storing space formed at an axial end face of the rotor. The oil storing space has an ejection hole narrower than the oil storing space. Atomized lubricating oil is supplied into the stator to cool the electric motor.

However, in the rotating electric machines configured as described above, an insulation coating at the coil ends of the stator is stripped of due to spraying of the coolant from the rotor toward the coil ends. In order to suppress thermal demagnetization of the magnets, the permanent magnets and an iron core of the rotor need to be cooled.

DISCLOSURE OF THE INVENTION

The present invention was therefore made in view of the above-described problems, and an object of the present invention is to provide a rotating electric machine enabling cooling of a cooling target region including permanent magnets disposed in a stator with a coolant, and to achieve reduction of the coolant to be sprayed to coil ends.

A rotating electric machine according to the present invention includes a rotation shaft arranged rotatably, a rotor having a storing hole capable of storing a permanent magnet, having the permanent magnet stored in the storing hole, and being fixed to the rotation shaft, a stator facing the rotor and having a coil, an end plate provided at an axial end of the rotor, and a coolant passage formed in the end plate and running along an axial end of the permanent magnet for allowing a coolant to flow. The end plate has a discharge hole capable of discharging the coolant. A cooling target region including the permanent magnet is defined at a portion of the rotor located at an outer circumferential side of the rotor from a radially inner end of the permanent magnet. Further, the discharge hole is located at a radially inner side of the rotor with respect to the cooling target region.

Preferably, there is further provided a supply channel formed in the rotation shaft and capable of supplying the coolant to the coolant passage. The coolant passage includes a first flow passage communicating with the supply channel, extending in the radial direction of the rotor and running along an axial end face of the permanent magnet, and a second flow passage connected to the first flow passage and extending from a connection point with the first flow passage to the radially inner side of the rotor to reach the discharge hole.

Preferably, the discharge hole is located at a rearward side in a rotation direction of the rotor with respect to the connection point between the coolant passage and the supply channel. Preferably, the discharge hole extends toward a radially outer side of the rotor while running from the coolant passage in the axial direction of the rotation shaft. Preferably, there is further provided a projection formed at a portion, in an axial end face of the end plate, adjacent to an opening of the discharge hole at the radially outer side of the rotor and protruding in the axial direction of the rotation shaft with respect to the axial end face of the end plate.

Preferably, an axial end of the projection is located at an axially outer side of the rotor with respect to an axial end of the coil.

It is expected from the beginning that the above-described structures may be combined appropriately according to necessity.

The rotating electric machine according to the present invention enables cooling of permanent magnets disposed in the stator, and suppresses the spraying of the coolant cooling the permanent magnets to the coil ends.

BEST MODES FOR CARRYING OUT THE INVENTION

A rotating electric machine according to the present embodiment will be described with reference to FIGS. 1 to 10.

It is to be noted that any reference to the number, amount or the like in the embodiment as will be described below is not necessarily intended to limit the scope of the present invention to that number, amount or the like, unless otherwise specified. In addition, each component in the following embodiment is not necessarily essential to the present invention, unless otherwise specified. When a plurality of embodiments are provided below, it is expected from the beginning that features of the respective embodiments may be combined appropriately according to necessity.

Figure 1:
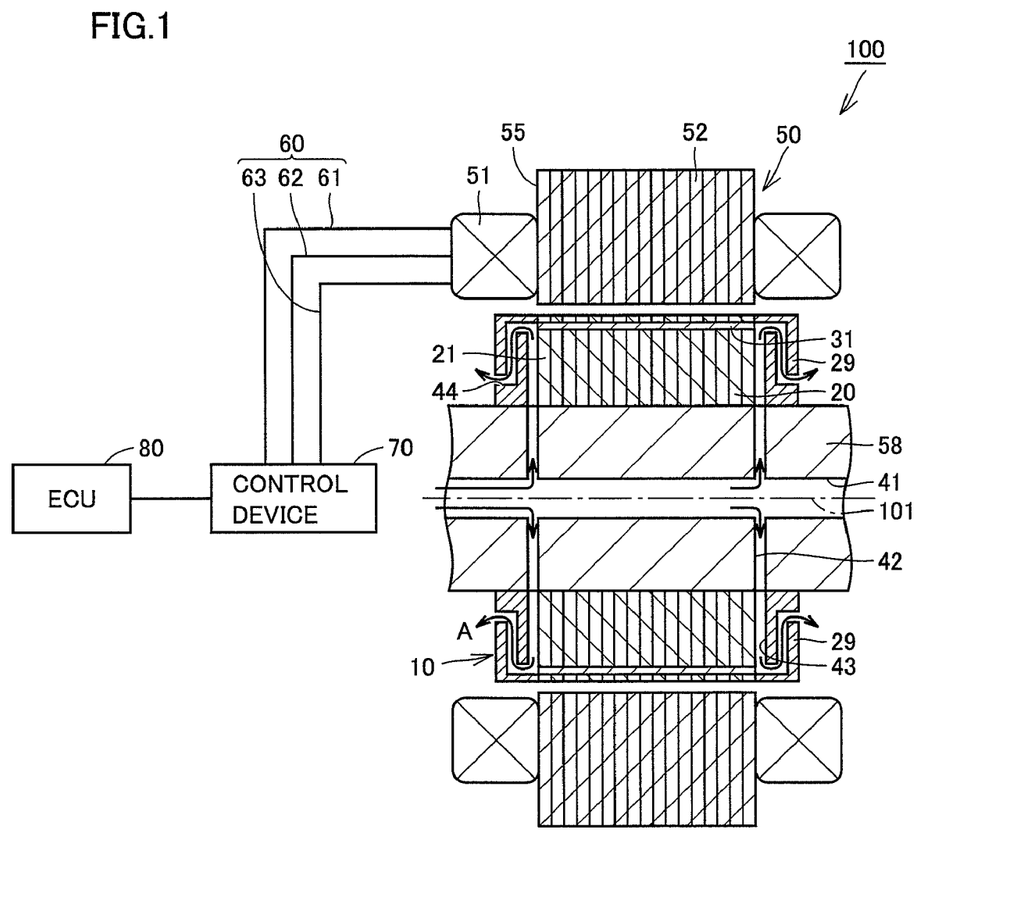
FIG. 1 is a sectional view showing a rotating electric machine according to an embodiment of the present invention.

FIG. 1 is a sectional view showing a rotating electric machine according to an embodiment of the present invention. The rotating electric machine shown in the drawing is a motor mounted on a hybrid vehicle having, as power sources, an internal combustion engine such as a gasoline engine or a diesel engine, and a motor supplied with electric power from a chargeable and dischargeable secondary cell (battery). The rotating electric machine represents a motor generator having at least one of the function as a motor supplied with electric power and the function as a power generator (generator).

With reference to FIG. 1, a rotating electric machine 100 includes a rotor 10 and a stator 50 arranged on the outer circumference of rotor 10. Rotor 10 is disposed on a shaft 58 extending along a central line 101. Shaft 58 rotates about central line 101 together with rotor 10.

Rotor 10 has a rotor core 20 and a permanent magnet 31 embedded in rotor core 20. In other words, rotating electric machine 100 is an rpm (Interior Permanent Magnet) motor.

Rotor core 20 is of a cylindrical shape along central line 101. Rotor core 20 is formed of a plurality of electromagnetic steel plates 21 stacked in the axial direction of central line 101.

An end plate 29 is provided at an axial end face of rotor 10 located in the direction of central line 101.

Stator 50 has a stator core 55 and a coil 51 wound around stator core 55. Stator core 55 is formed of a plurality of electromagnetic steel plates 52 stacked in the axial direction of central line 101. It is to be noted that rotor core 20 and stator core 55 are not limited to electromagnetic steel plates, and each may be implemented by a powder magnetic core, for example.

Coil 51 is electrically connected to a control device 70 via a three-phase cable 60. Three-phase cable 60 includes a U-phase cable 61, a V-phase cable 62 and a W-phase cable 63. Coil 51 includes a U-phase coil, a V-phase coil and a W-phase coil. U-phase cable 61, V-phase cable 62 and W-phase cable 63 are connected to terminals of these three coils, respectively.

Control device 70 receives, from an ECU (Electrical Control Unit) 80 mounted on the hybrid vehicle, a torque command value to be output from rotating electric machine 100. Control device 70 generates a motor control current for output of the torque specified by the torque command value, and supplies the motor control current to coil 51 via three-phase cable 60.

Figure 2:
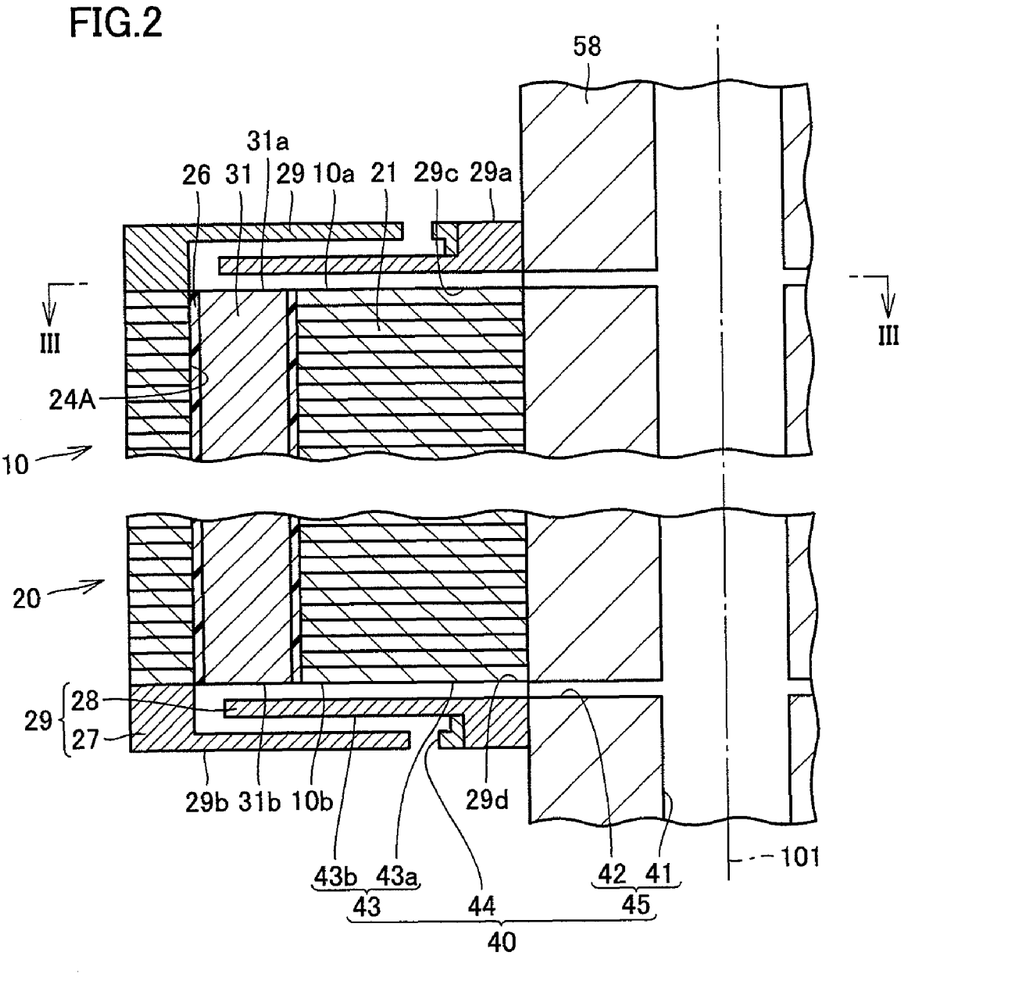
FIG. 2 is an enlarged sectional view of a portion of a rotor shown in FIG. 1.
Figure 3:
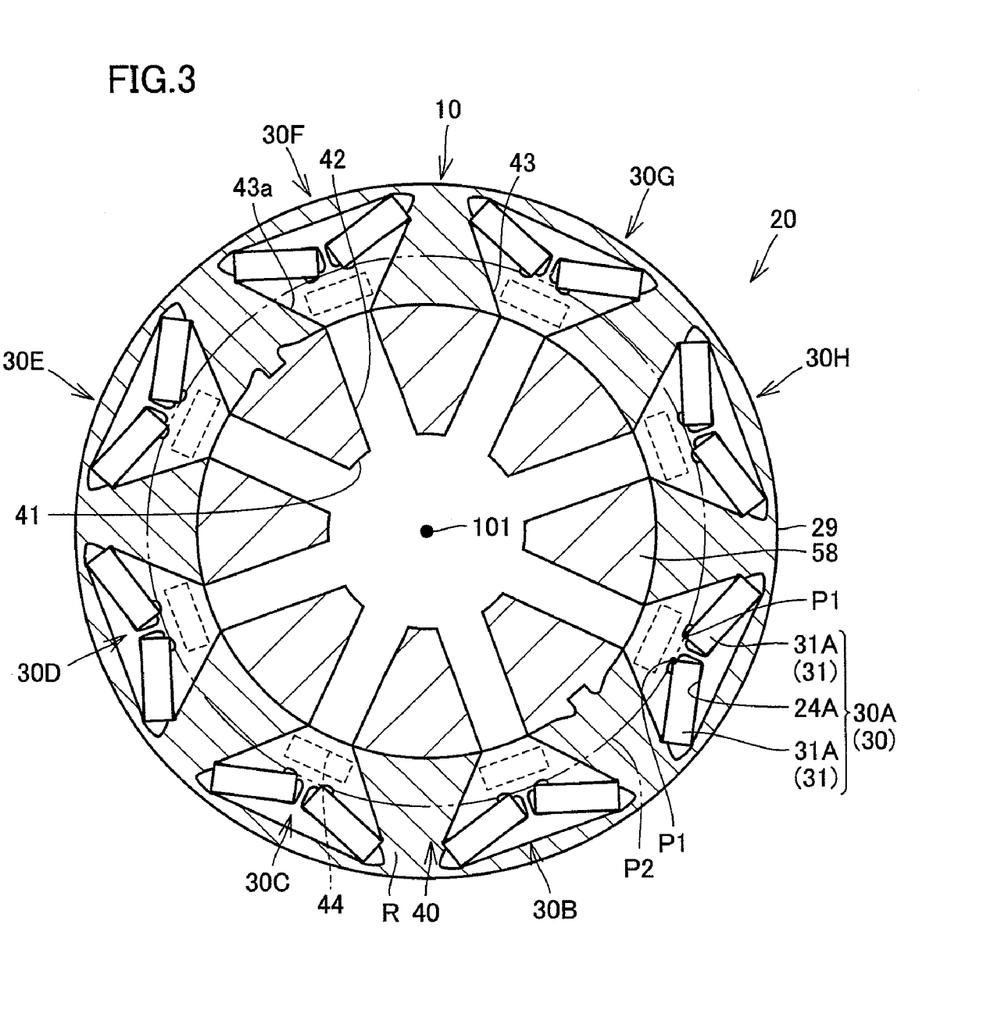
FIG. 3 is a sectional view taken along the line III-III of FIG. 2.

FIG. 2 is an enlarged sectional view of a portion of rotor 10 shown in FIG. 1. FIG. 3 is a sectional view taken along the line III-III of FIG. 2. As shown in FIGS. 2 and 3, magnet groups 30A to 30H defining a plurality of magnetic poles are provided in rotor 10. Magnet groups 30A to 30H each include two permanent magnets 31. For example, magnet group 30A includes two permanent magnets 31A (31). Permanent magnets 31 are arranged in the circumferential direction of rotor 10. Magnetic poles defined by adjacent ones of magnet groups 30A to 30H in the circumferential direction of rotor 10 are different from each other.

Rotating electric machine 100 includes a magnet cooling passage 40 for cooling permanent magnets 31 constituting each of magnet groups 30A to 30H. This magnet cooling passage 40 has a coolant passage 45 formed in shaft 58, a coolant passage 43 communicating with this coolant passage 45 and formed in end plate 29, and a discharge hole 44 communicating with coolant passage 43.

Herein, as rotor 10 rotates with the passage of magnetic flux from coil 51 of stator 50 shown in FIG. 1 through rotor 10, the amount of magnetic flux passing through rotor 10 varies sequentially. In FIG. 3, the temperature of rotor 10 is higher at a portion located at a radially outer side of rotor 10 than at a radially inner end P1 of each of permanent magnets 31.

Accordingly, in the present embodiment, a cooling target region R is defined as an annular region including axial end faces 31a, 31b of each of permanent magnets 31 and located at the radially outer side of rotor 10 with respect to a reference line P2 passing through radially inner end P1 of each of permanent magnets 31.

Coolant passage 45 has an axial passage 41 extending along central line 101, and a radial passage 42 communicating with this axial passage 41 and extending in the radial direction of shaft 58 toward each of magnet groups 30A to 30H.

Coolant passage 43 has a flow passage (first flow passage) 43a connected to radial passage 42 and extending toward each of magnet groups 30A to 30H, and a flow passage (second flow passage) 43b connected to a radially outer end of this flow passage 43b and extending from the radially outer end to a radially inner side of rotor 10.

Flow passage 43a is defined by a channel formed at major surface 29c, 29d facing axial end face 10b of rotor 10, among major surfaces 29a-29d of end plate 29, and by axial end face 10a, 10b of rotor 10.

This flow passage 43a extends to the radially outer side of axial end face 10a, 10b of rotor 10 with respect to a reference line P2 to run into cooling target region R. Coolant A flowing through flow passage 43a cools at least a portion of cooling target region R, thereby achieving a reduced iron loss.

In surfaces of permanent magnets 31 defining each of magnet groups 30A to 30H, flow passage 43a runs along axial end face 31a, 31b located in the axial direction of rotor core 20. Particularly, flow passage 43a is formed such that rotor 10 has a greater width in the circumferential direction of rotor 10 to the radially outer side of rotor 10, and runs along the entire surface of axial end face 31a, 31b of each of permanent magnets 31. Accordingly, permanent magnets 31 having a low thermal resistance can be cooled with coolant A.

In FIG. 2, flow passage 43b is connected to a radially outer end of flow passage 43a, and extends from this radially outer end of flow passage 43a toward the radially inner side of rotor 10. Forming coolant passage 43 long in end plate 29 as described increases the contact area between coolant A and end plate 29, resulting in favorable cooling of end plate 29, which achieves a reduction in temperature rise of the magnets due to heat generated in end plate 29.

Discharge hole 44 is open at a portion, in major surface 29a, 29b of end plate 29, located at the radially inner side with respect to cooling target region R. Coolant A is discharged outwardly through this discharge hole 44.

Further, since discharge hole 44 is located at the radially inner side with respect to cooling target region R, the centrifugal force applied to coolant A discharged through discharge hole 44 is smaller than the centrifugal force applied to coolant A when discharged from a circumferential portion of rotor 10.

The ejection speed of coolant A when ejected at the opening of discharge hole 44 can thereby be reduced, which prevents stripping of an insulation coating or the like of the coil even when coolant A discharged through discharge hole 44 reaches the coil ends.

It is to be noted that end plate 29 has an inner-side defining member 28 mounted to shaft 58 to define flow passage 43a in cooperation with axial end face 10a, 10b of rotor 10, and an outer-side defining member 27 mounted to this inner-side defining member 28 to define flow passage 43b. Constituting end plate 29 by these two easy-to-manufacture members achieves reduced manufacturing costs and simplified manufacturing steps of end plate 29.

Figure 4:
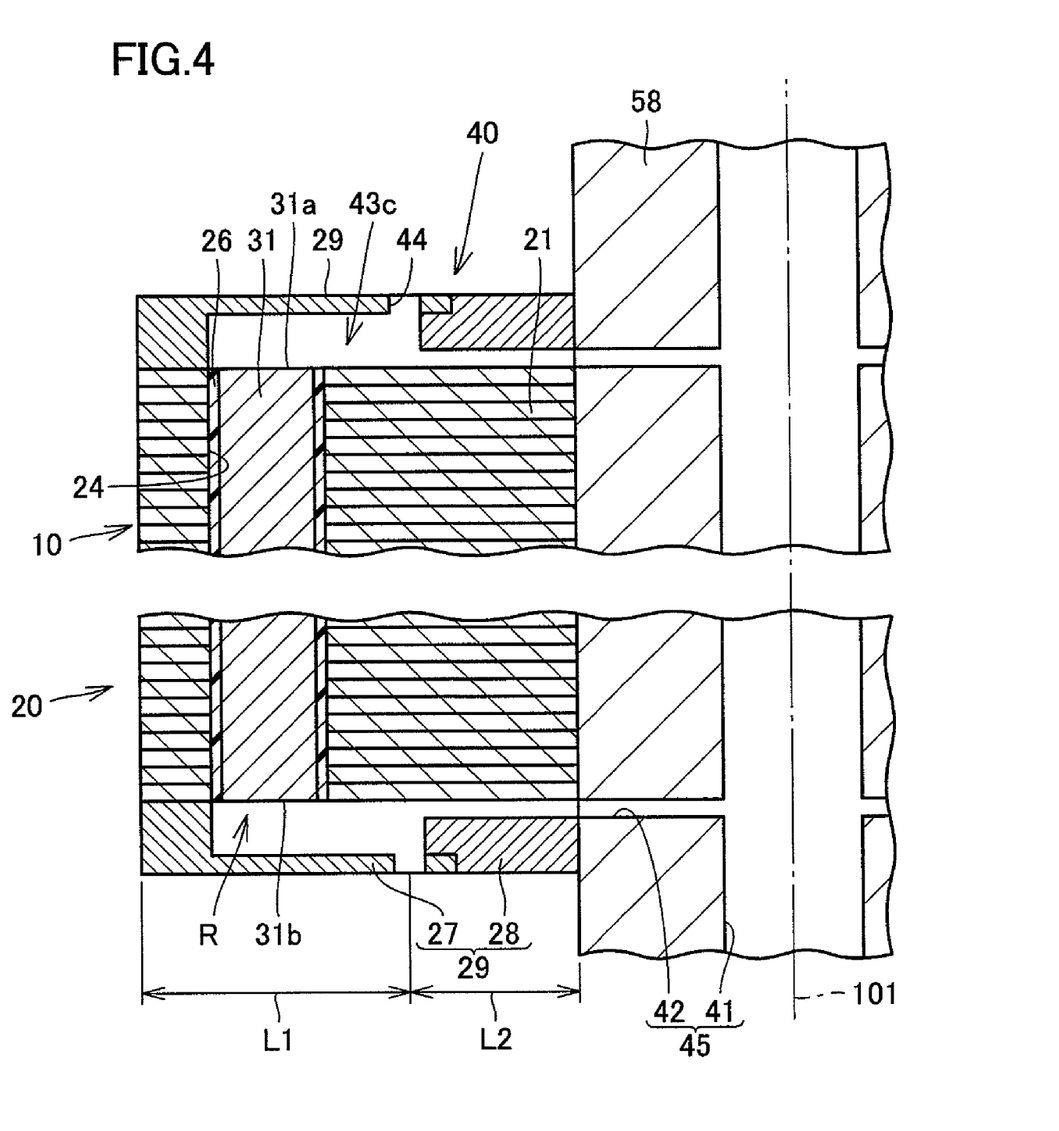
FIG. 4 is a sectional view showing a first modification of the rotating electric machine according to the embodiment of the present invention.

FIG. 4 is a sectional view showing a first modification of rotating electric machine 100 according to the embodiment of the present invention. As shown in FIG. 4, rotating electric machine 100 includes a flow passage 43c formed in end plate 29 through which coolant A can flow. Flow passage 43c has a flow passage area greater than that of radial passage 42. Herein, the flow passage area represents an area taken perpendicularly to the radial direction of rotor 10 with respect to each flow passage. Flow passage 43c is also formed to run along axial end face 31a, 31b of each of permanent magnets 31.

Coolant A having entered flow passage 43c circulates through flow passage 43c. At this stage, coolant A passes by axial end face 31a, 31b of each of permanent magnets 31 to thereby cool permanent magnets 31.

This flow passage 43c also has discharge hole 44 at a portion located at the radially inner side of rotor 10 with respect to cooling target region R. Particularly, a distance L2 between an inner circumferential edge of rotor 10 and discharge hole 44 is set greater than a distance L1 between an outer circumferential edge of rotor 10 and discharge hole 44.

Accordingly, in the rotating electric machine according to this second modification, the centrifugal force applied to coolant A being discharged through discharge hole 44 is also reduced. This prevents the coolant from being sprayed to the coil ends of stator 50, which prevents damage to the insulation coating of the coil.

Figure 5:
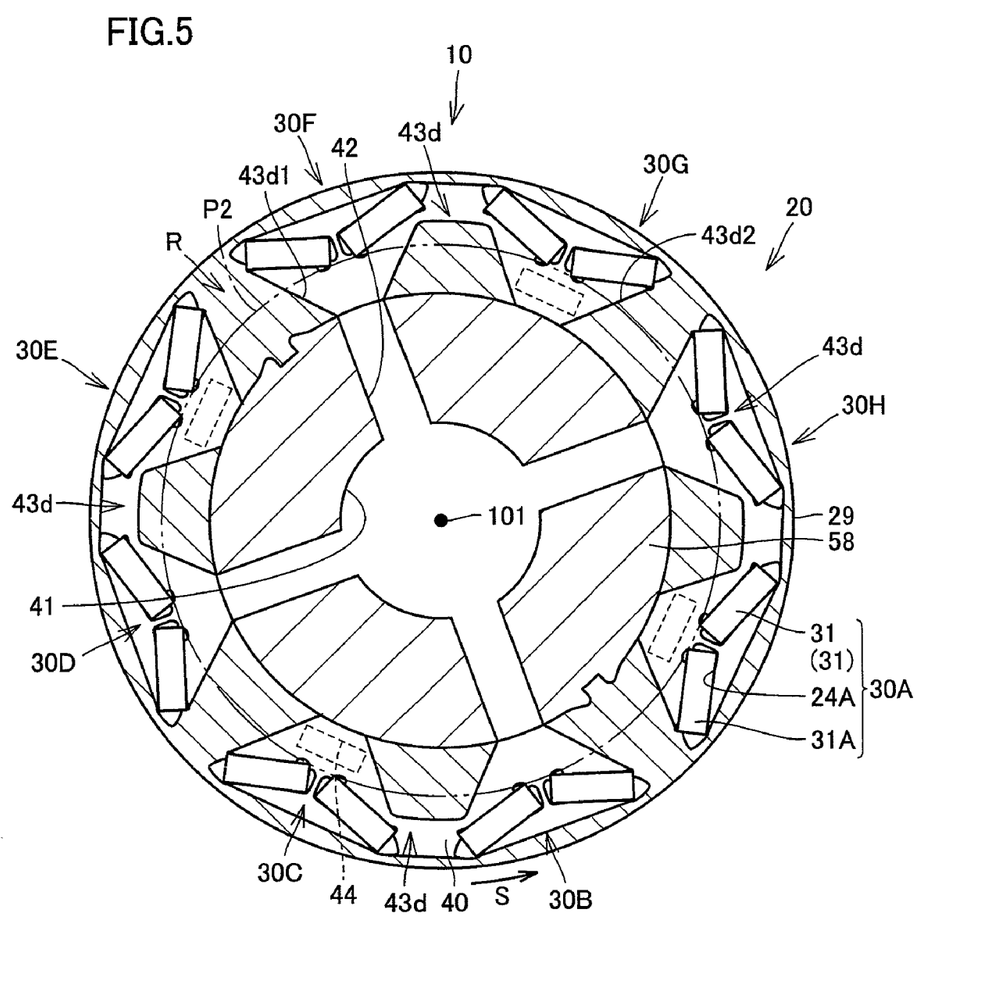
FIG. 5 is a sectional view showing a second modification of the rotating electric machine according to the embodiment of the present invention.

FIG. 5 is a sectional view showing a second modification of rotating electric machine 100 according to the embodiment of the present invention. In the modification shown in FIG. 5, radial passage 42 extends toward magnet groups 30B, 30D, 30F and 30H arranged at intervals in the circumferential direction among magnet groups 30A to 30H.

A passage 43d communicating with each radial passage 42 is formed in end plate 29. This passage 43d has a cooling chamber 43d1 formed to cover each of magnet groups 30B, 30D, 30F and 30H arranged at intervals in the circumferential direction, and a cooling chamber 43d2 communicating with cooling chamber 43d1 and located at a rearward side in a rotation direction S with respect to cooling chamber 43d1.

Cooling chamber 43d2 is formed to cover magnet groups 30C, 30E, 30G and 30A located at the rearward side in the rotation direction S with respect to magnet groups 30B, 30D, 30F and 30H, respectively. Each cooling chamber 43d2 has discharge hole 44.

Accordingly, coolant A enters cooling chamber 43d1 from each radial passage 42 by the centrifugal force. As rotor 10 is accelerated in the rotation direction S, coolant A flows in the reverse direction to the rotation direction S by the inertial force, and then enters cooling chamber 43d2 from cooling chamber 43d1. Permanent magnets 31 of each of magnet groups 30A to 30H are each cooled as described. It is to be noted that, in this modification shown in FIG. 5, discharge hole 44 is also located at the radially inner side with respect to cooling target region R (reference line P2).

Figure 6:
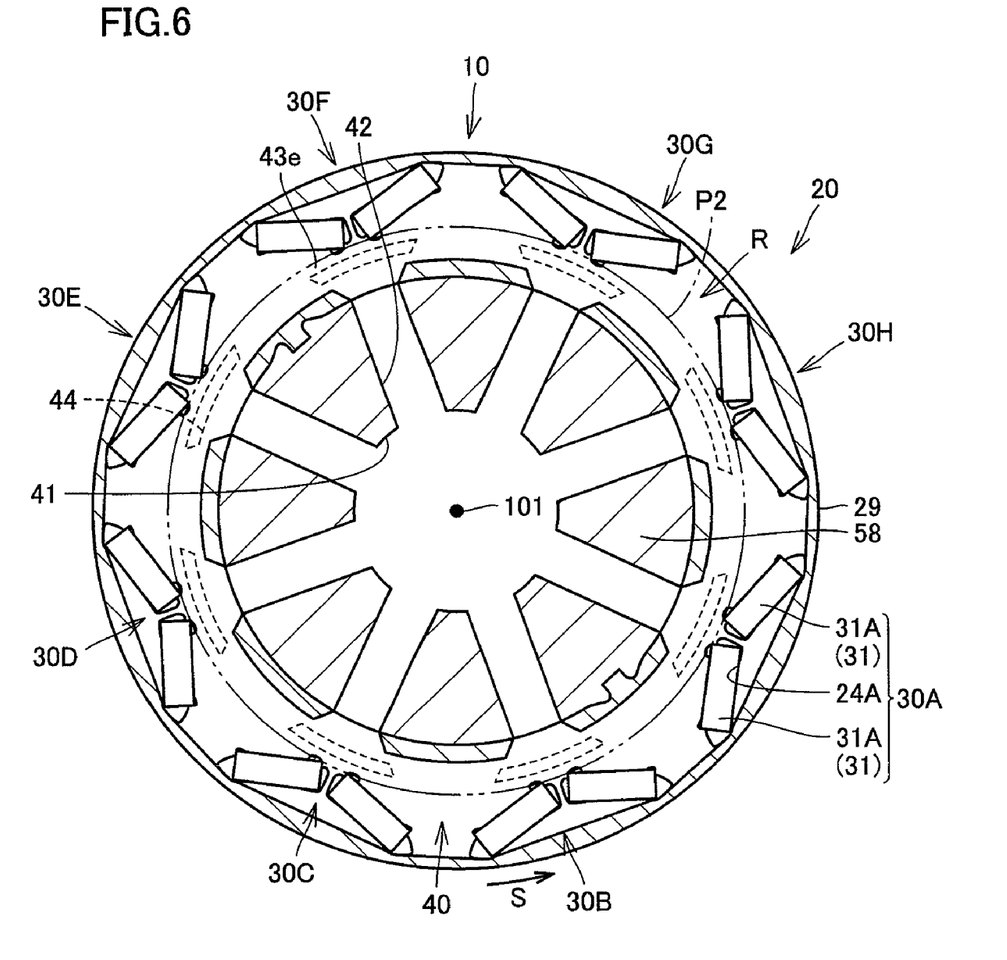
FIG. 6 is a sectional view showing a third modification of the rotating electric machine according to the embodiment of the present invention.

FIG. 6 is a sectional view showing a third modification of the rotating electric machine according to the embodiment of the present invention. In the modification shown in FIG. 6, shaft 58 has a plurality of radial passages 42 extending toward respective magnet groups 30A to 30H, and an annular flow passage 43e formed in end plate 29 and communicating with all of radial passages 42.

This flow passage 43e extends so as to run along an axial end face of permanent magnets 31 constituting each of magnet groups 30A to 30H. Further, flow passage 43e has a plurality of discharge holes 44 formed at intervals in the circumferential direction of rotor 10. It is to be noted that, in this modification shown in FIG. 6, the opening of each discharge hole 44 is also located at the radially inner side with respect to cooling target region R.

In the rotating electric machine shown in FIG. 6 with flow passage 43e extending annularly, coolant A flows through flow passage 43e in rotation direction S or in the reverse direction to rotation direction S when rotor 10 is accelerated or decelerated in rotation direction S. In either case, each permanent magnet 31 and end plate 29 can be cooled.

Herein, white portions of cooling target region R located among magnet groups 30A to 30H are raised in temperature during rotation of rotor 10, the portions can be cooled favorably because the coolant also passes through the portions located among magnet groups 30A to 30H in rotor core 20.

Figure 7:
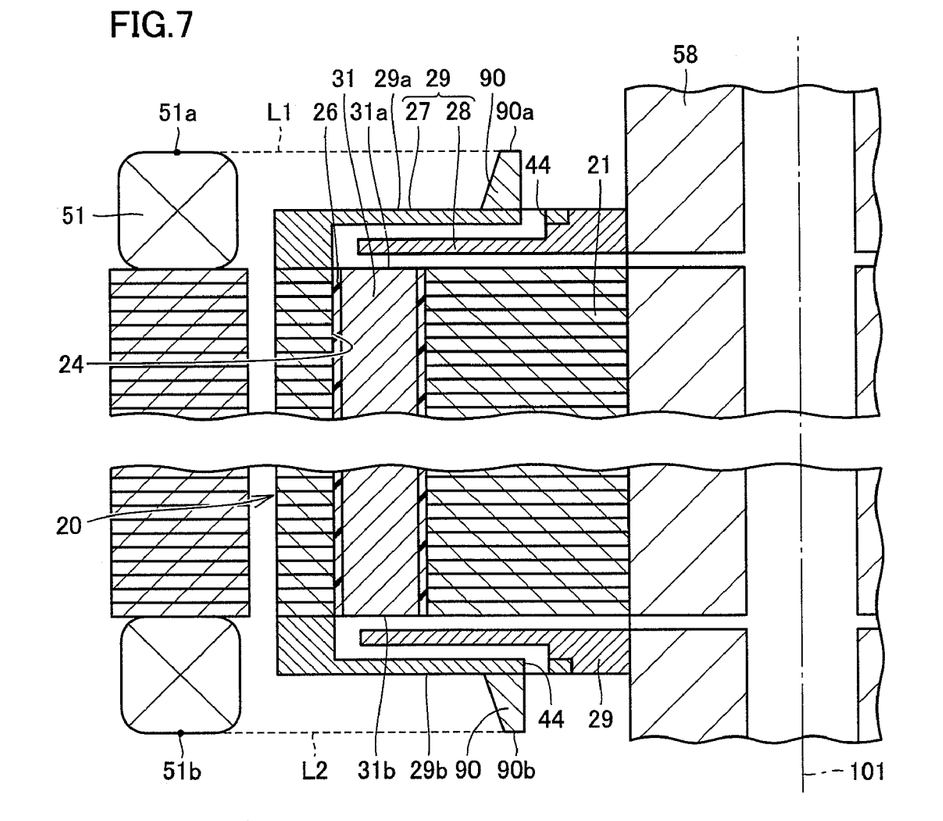
FIG. 7 is a sectional view showing a fourth modification of the rotating electric machine according to the embodiment of the present invention.

FIG. 7 is a sectional view showing a fourth modification of the rotating electric machine according to the embodiment of the present invention. In the modification shown in FIG. 7, the opening of discharge hole 44 is formed at major surface 29a, 29b located at an axial end of each end plate 29, and a projection 90 protruding to the axially outer side is formed at a position adjacent to the opening of discharge hole 44 at the radially outer side of rotor 10, in major surface 29a, 29b located at the axial end of each end plate 29.

Coolant A discharged through discharge hole 44 is displaced in the direction of central line 101 by projection 90, and then outgoes in the radial direction from axial end 90a, 90b of projection 90. Accordingly, in coolant A discharged through discharge hole 44, the ratio of coolant A to be sprayed to coil 51 can be reduced.

Axial end 90a of projection 90 corresponds to axial end 51a of coil 51 or protrudes in the direction of central line 101.

Herein, coolant A outgoes in the radial direction of rotor 10 from axial end 90a of projection 90 by the centrifugal force. Therefore, locating axial end 90a of projection 90 as described can further reduce the spray amount of coolant A to be sprayed to coil 51.

Figure 8:
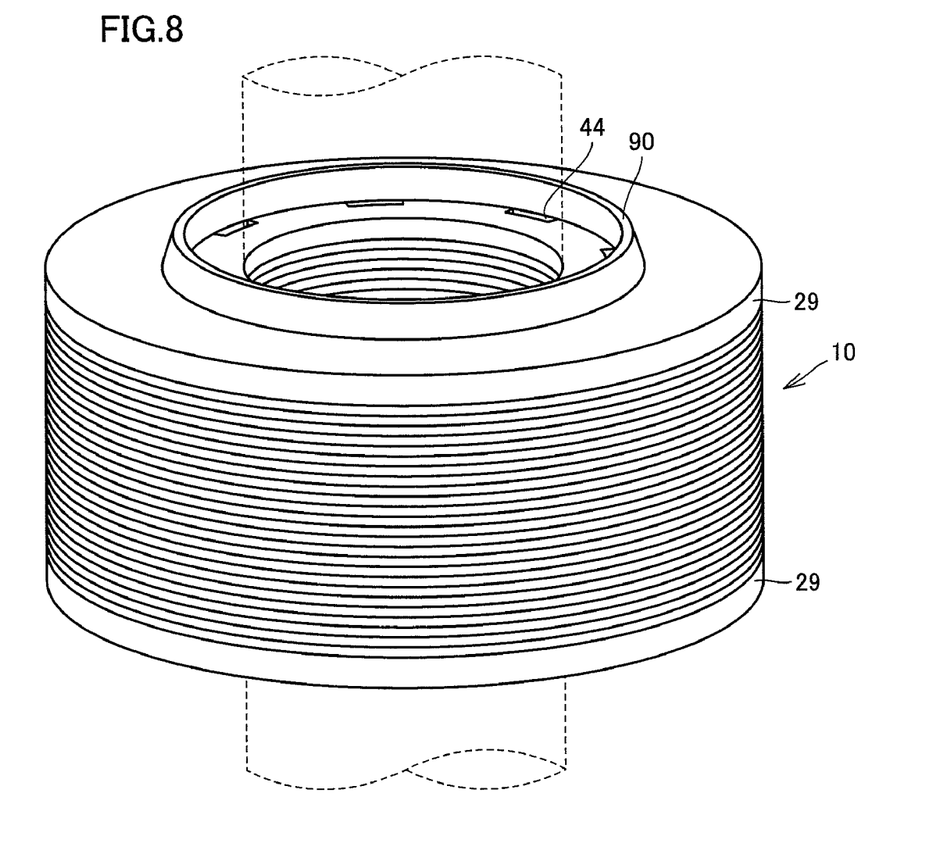
FIG. 8 is a perspective view of a rotor of the rotating electric machine shown in FIG. 7.

FIG. 8 is a perspective view of rotor 10 of rotating electric machine 100 shown in FIG. 7. As shown in FIG. 8, projection 90 is formed annularly to extend in the circumferential direction of rotor 10. Accordingly, projection 90 causes a large part of coolant A discharged at the opening of each discharge hole 44 to be displaced in the direction of central line 101 to be thereby prevented from being sprayed to coil 51.

Figure 9:
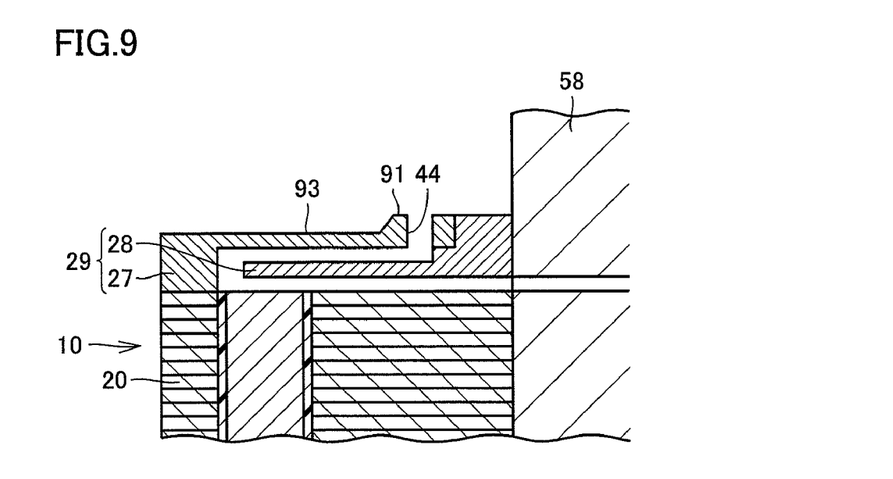
FIG. 9 is a partial sectional view showing a modification of a projection.

FIG. 9 is a partial sectional view showing a modification of the projection. As shown in FIG. 9, a flat portion 91 is formed at a position adjacent to the opening of discharge hole 44 at the radially outer side of rotor 10. A recess 93 is formed at a portion adjacent to flat portion 91 at the radially outer side.

In the modification shown in FIG. 9, coolant A discharged through discharge hole 44 outgoes from the border between flat portion 91 and recess 93 (outer circumferential edge of flat portion 91). In other words, arranging the border between flat portion 91 and recess 93 to protrude in the direction of central line 101 with respect to axial end 51*a* of coil 51 can reduce the spray amount of coolant A to be sprayed to coil 51.

Figure 10:
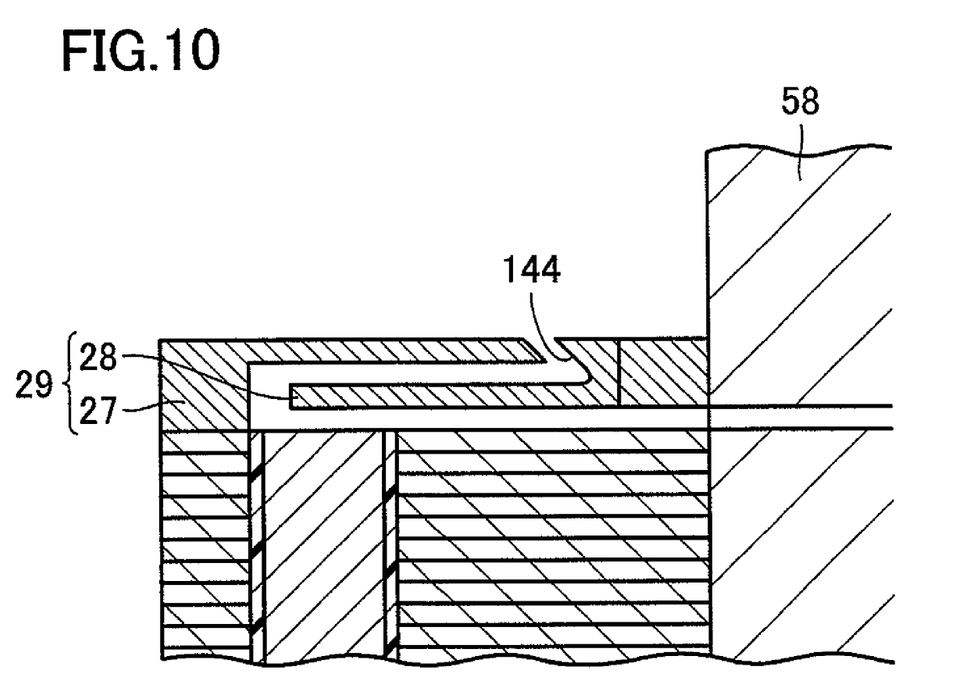
FIG. 10 is a sectional view of a rotor showing a modification of a discharge hole.

FIG. 10 is a sectional view of rotor 10 showing a modification of a discharge hole. In the modification shown in FIG. 10, a discharge hole 144 extends toward the radially outer side of rotor 10 while running outwardly along central line 101. Accordingly, coolant A receives a stress in the direction of central line 101 from the inner surface of end plate 29 defining discharge hole 144 during the passage of coolant A through discharge hole 144. Accordingly, coolant A discharged at the opening of discharge hole 144 has a speed component in the direction of central line 101, and outgoes from axial end 51*a* of coil 51 toward the radially outer side of rotor 10. In this manner, in the rotating electric machine shown in FIG. 10, the spray amount of coolant A to be sprayed to coil 51 can also be reduced.

While the embodiment of the present invention has been described above, it should be construed that the embodiment disclosed herein is by way of illustration in all respects, not by way of limitation. It is intended that the scope of the present invention is defined by claims, and includes all modifications equivalent in meaning and scope to the claims. Further, the above numeric values or the like are merely provided for illustrative purposes, and the present invention is not limited to the aforementioned numeric values and ranges.

Industrial Applicability

The present invention is suitable for a rotating electric machine, and more particularly suitable for a rotating electric machine enabling cooling of permanent magnets provided in permanent magnets disposed in a rotor, while preventing stripping of an insulation coating of a stator coil.

The invention claimed is:

1. A rotating electric machine comprising:
    a rotation shaft arranged rotatably;
    a rotor having a storing hole capable of storing a permanent magnet, including the permanent magnet stored in said storing hole, and being fixed to said rotation shaft;
    a stator facing said rotor and including a coil;
    an end plate provided at an axial end of said rotor;
    a coolant passage formed in said end plate and running along an axial end of said permanent magnet for allowing a coolant to flow,
    said end plate having a discharge hole communicating with said coolant passage and capable of discharging said coolant,
    a cooling target region including said permanent magnet being defined at a portion of said rotor located at an outer circumferential side of said rotor with respect to a radially inner end of said permanent magnet,
    said discharge hole being located at a radially inner side of said rotor with respect to said cooling target region, and
    said coolant passage includes a first flow passage and a second flow passage, said first flow passage formed by the axial end of the rotor and the end plate, extending in a radial direction of said rotor, said coolant passage reaching said cooling target region and being formed such that a width of said rotor in a circumferential direction increases toward a radially outer side of said rotor, and said second flow passage formed by the end plate, connected to said first flow passage and extending from a connection point with the first flow passage to the radially inner side of said rotor to reach said discharge hole.

2. The rotating electric machine according to claim 1, further comprising a supply channel formed in said rotation shaft and capable of supplying said coolant to said coolant passage, wherein
    said first flow passage communicating with said supply channel and running along an axial end face of said permanent magnet.

3. The rotating electric machine according to claim 2, wherein said discharge hole is located at a rearward side in a rotation direction of said rotor with respect to the connection point between said coolant passage and said supply channel.

4. The rotating electric machine according to claim 1, wherein said discharge hole extends toward a radially outer side of said rotor while running from said coolant passage in an axial direction of said rotation shaft.

5. The rotating electric machine according to claim 1, further comprising a projection formed at a portion, in an axial end face of said end plate, adjacent to an opening of said discharge hole at a radially outer side of said rotor and protruding in an axial direction of said rotation shaft with respect to the end face of said end plate.

6. The rotating electric machine according to claim 5, wherein an axial end of said projection is located at an axially outer side of said rotor with respect to an axial end of said coil.

7. The rotating electric machine according to claim 1, wherein said first flow passage is formed to run along an entire surface of the axial end face of said permanent magnet.

8. The rotating electric machine according to claim 1, further comprising a supply channel capable of supplying said coolant to said coolant passage, said supply channel including a radial passage extending in the radial direction toward the permanent magnet and connected to said coolant passage.

* * * * *